C. NIELSEN.
SPLASH SCREEN FOR AUTOMOBILES.
APPLICATION FILED JULY 22, 1919.
1,432,724.  Patented Oct. 17, 1922.
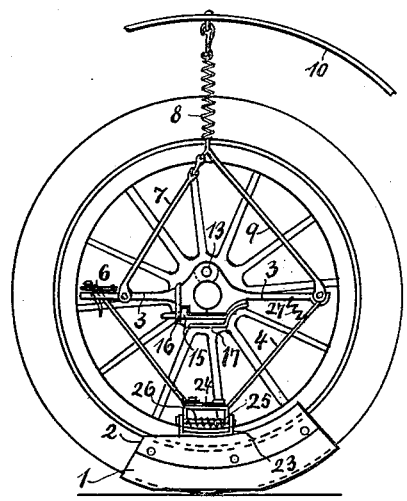
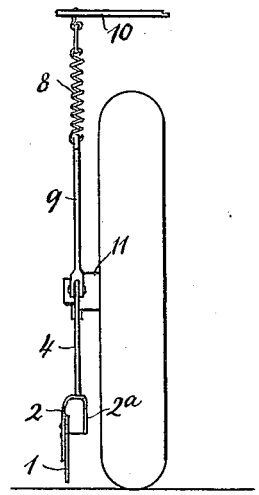
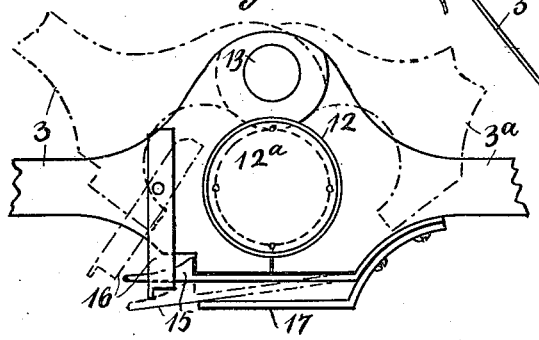
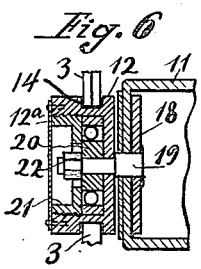
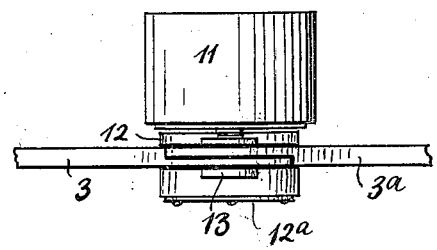
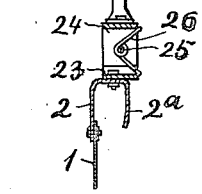
Inventor
Christen Nielsen
By
B. Singer, Atty.

Patented Oct. 17, 1922.

1,432,724

UNITED STATES PATENT OFFICE.

CHRISTEN NIELSEN, OF COPENHAGEN, DENMARK.

SPLASH SCREEN FOR AUTOMOBILES.

Application filed July 22, 1919. Serial No. 312,629.

*To all whom it may concern:*

Be it known that I, CHRISTEN NIELSEN, guide in the topographical department of the staff, a subject of the King of Denmark, residing at Copenhagen, Denmark, have invented certain new and useful Improvements in Splash Screens for Automobiles, (for which I have secured patent in Denmark, #21,226, May 5, 1916,) of which the following is a specification.

This invention relates to improvements in splash screens or mud guards for automobiles, especially adapted for use on automobile wheels to prevent the mud from being splashed laterally from the wheels and also prevents the wheels from being splashed.

The object of the invention is to provide an improved splash screen or mud guard of this character which is simple in construction, which can be readily attached to, or removed from an automobile wheel, which is not likely to get out of order, and which is efficient in operation.

With the above mentioned object in view the invention consists in the construction, combination and arrangement of devices hereinafter described and claimed.

In the accompanying drawing:—

Fig. 1 is a side elevation of a splash screen constructed and arranged in accordance with my invention, and showing the same in place on an automobile wheel.

Fig. 2 is an end elevation of the screen.

Fig. 3 is a detail elevation of the lever and some of its connections.

Fig. 4 is a similar view of the central portion of the lever on a larger scale.

Fig. 5 is a detail plan view of the central portion of the lever, the ball-bearing, and the dust cap of the automobile wheel.

Fig. 6 is a detail sectional view of the dust cap and the ball-bearing.

Fig. 7 is a detail sectional view of the splash screen.

The screen consists of an arcuate piece of india rubber 1 (Figs. 1, 2 and 7), placed on a steel-band 2 and approximately the curve of the wheel. The screen is supported by a horizontal lever 3, which by means of a ball-bearing is suspended on the dust cap of the wheel. From the front end of the said lever a bar 4 extends downwardly to the screen and is secured to the band 2, the latter by means of a strap 5 being connected to the rear end of the lever. The said strap, which is led up through a placket in the lever and down through another placket, has adjusting holes, by which the same in different lengths can be fastened on a button 6 (Figs. 1 and 3).

Above this button with the view of keeping the strap in position during the drive a feathering holder 6$^a$ may be placed.

Any suitable fastening means may be employed for this purpose.

The strap permits vertical movement of the screen, the rod 4 turning on its pivotal point of connection with the lever 3.

When the strap is shortened, the screen will be lifted up from the ground; and if it is not desired to use the screen, the same can also by means of the strap be lifted up to the hub.

In order to keep the screen in balance during the drive a rail 7 is employed, which has one end fastened to one end of the lever 3 and its other end attached to a suspension-spring 8, from which a rail 9 leads and is detachably fastened to the opposite end of the lever 3.

The spring 8 is fastened to the usual mud guard 10. 11 (Figs. 5 and 6) indicates the dust cap, 12 the outer member of the ball-bearing on which the two parts 3 and 3$^a$ of the bearing lever are suspended. The said lever-parts are connected together by a joint 13 and their opposing ends enter the annular groove 14 of the outer ball bearing member 12. For securing together the parts of the lever, to hold the same on the ball-bearing, a spring hook 15 is employed, which on account of its slanted head can be pressed down by the lever-part 3, when the latter is closed, so that the arrangement of the screen on the ball bearing may be accomplished by merely placing the lever members 3, 3$^a$ about the ball-bearing and closing them thereon. In order to secure the spring hook in closed position a catch 16 (Fig. 4) is employed, while to prevent a too violent pressing down of the spring hook, when the screen has to be taken off, a stop 17 is provided.

To remove the screen it is required to only press the hook 15 out of engagement with lever member 3 and to then turn the lever parts 3, 3$^a$, as indicated by dotted lines in Fig. 4, so that they get disengaged from the groove 14. In the closed position of the lever the screen occupies only a small space in the carriage, when it is not in use.

As already mentioned, the screen is suspended on the dust-cap by means of a ball-bearing, shown in Fig. 6. Such a suspension on the dust cap has hitherto been difficult, by reason of the slight length of the dust cap. According to my invention, a disk 18 is arranged in the outer end of the dust cap. A pivot 19 passes through said disk and the outer end of the cap and also through an outer disk 12$^a$. The levers 3, 3$^a$, bearing the screen, are placed as before stated, in the annular groove 14 of the outer member of the ball bearing 12, and in the outer end of the said member a disk 21 is screwed. On the outer end of the pivot 19 is screwed a nut 22. On the outer end of the member 12 a thin metal disk 12$^a$ may also be secured, which keeps the disk 21 in place, and prevents the dust from entering the ball bearing.

The steel band 2 carrying the india rubber plate 1 is fastened to the lower part 23 of a hinge, the upper part 24 of which is connected with the bar 4 and the strap 5. About the hinge pin 25 is wound a screw spring 26, the ends of which bear against the hinge parts 23, 24, so that said spring keeps the screen in normal position. If the screen during the drive is brought into contact with the pavement or the like, it is turned about the pin 25 against the wheel-ring, so that no break occurs. When water and dirt from the wheel are forcibly thrown against the screen, there is a tendency to throw the same back from the screen against the wheel, and thereby soil the latter.

To overcome this objection and in accordance with my invention, I provide the screen element 1 with an inner depending screen flange 2$^a$ which converges upwardly toward the outer flange 2 and is of less depth than said outer flange and serves to catch the dirt thrown inwardly by said outer flange, and thus prevents said dirt from being thrown against the wheel.

The movable bar 4 is pressed outwardly by a spring 27 allowing the screen to move up and down during the drive, as the ground makes it necessary.

By my combination of the described devices a splash-screen is obtained, which is easy to fix and remove, which act protects the wheel from becoming soiled, is not likely to be injured during use, demands small space, when not used, and is relatively cheap to produce.

Having now described my invention what I claim is:

A splash screen for an automobile wheel, comprising a bearing member and means to mount said member on a dust cap for rotation, a horizontal lever comprising two pivotally connected arms, detachably secured on said member, a screen element, a rod pivotally connected at the upper end to one arm of said lever and attached at the lower end to said screen element, and a yieldable member attached to said screen element and adjustably connected to the other arm of said lever.

In witness whereof I have hereunto set my hand in presence of two witnesses.

CHRISTEN NIELSEN.

Witnesses:
 CAR FREDERICK OEHLERS,
 E. W. EILSKOV.